(12) United States Patent
Liu et al.

(10) Patent No.: US 9,592,456 B2
(45) Date of Patent: Mar. 14, 2017

(54) METHODS FOR ENHANCING PRODUCTION OF ALUMINUM HYDROXIDE IN AN ALUMINUM HYDROXIDE PRODUCTION PROCESS

(71) Applicant: ECOLAB USA INC., St. Paul, MN (US)

(72) Inventors: Jianjun Liu, Aurora, IL (US); Kevin O'Brien, Saint Charles, IL (US)

(73) Assignee: ECOLAB USA INC., St. Paul, MN (US)

( * ) Notice: Subject to any disclaimer, the term of this patent is extended or adjusted under 35 U.S.C. 154(b) by 98 days.

(21) Appl. No.: 14/619,979

(22) Filed: Feb. 11, 2015

(65) Prior Publication Data

US 2016/0230248 A1 Aug. 11, 2016

(51) Int. Cl.
*C13K 1/10* (2006.01)
*B01D 9/00* (2006.01)

(52) U.S. Cl.
CPC ...... *B01D 9/005* (2013.01); *B01D 2009/0095* (2013.01)

(58) Field of Classification Search
CPC .............. C13K 1/10; B01J 13/00; B01D 9/00
USPC .......................................... 23/295 G, 295 R
See application file for complete search history.

(56) References Cited

U.S. PATENT DOCUMENTS

| | | |
|---|---|---|
| 2,181,695 A | 11/1939 | Given et al. |
| 2,184,703 A | 12/1939 | Spangenberg |
| 2,257,347 A | 9/1941 | Raymer |
| 3,642,437 A | 2/1972 | Angstadt et al. |
| 4,256,709 A | 3/1981 | Sizyakov et al. |
| 4,737,352 A | 4/1988 | Owen et al. |
| 5,106,599 A | 4/1992 | Roe |
| 5,312,603 A | 5/1994 | Hachgenei et al. |
| 6,168,767 B1 | 1/2001 | Welton et al. |
| 6,599,489 B2 | 7/2003 | Mahoney et al. |
| 7,771,681 B2 | 8/2010 | Kouznetsov et al. |
| 7,955,589 B2 | 6/2011 | Malito et al. |
| 7,976,820 B2 | 7/2011 | Liu et al. |
| 7,976,821 B2 | 7/2011 | Liu et al. |

FOREIGN PATENT DOCUMENTS

EP    0 465 055 B1    4/1997

*Primary Examiner* — Edward Johnson
(74) *Attorney, Agent, or Firm* — Kagan Binder, PLLC

(57) ABSTRACT

Compositions and methods used in the modification of crystallization of aluminum hydroxide from liquor in an aluminum hydroxide production process, such as the Bayer process. More particularly, crystal growth modifier compositions comprising a component of crude corn oil derived from a bioethanol production process and/or a component of biodiesel and methods of using such compositions to modify particle size and distribution of precipitated alumina trihydrate in a precipitation liquor crystallization process.

4 Claims, No Drawings

METHODS FOR ENHANCING PRODUCTION OF ALUMINUM HYDROXIDE IN AN ALUMINUM HYDROXIDE PRODUCTION PROCESS

CROSS REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The present invention relates to compositions and methods used in the modification of crystallization of aluminum hydroxide from liquor in an aluminum hydroxide production process, such as the Bayer process. More particularly, crystal growth modifier compositions comprising a component of crude corn oil derived from a bioethanol production process and/or a component of biodiesel and methods of using such compositions to modify particle size and distribution of precipitated alumina trihydrate in a precipitation liquor crystallization process.

BACKGROUND OF THE INVENTION

Aluminium is the most widely used non-ferrous metal. Although it is one of the most abundant elements, Aluminium in its native state is rare and instead it is primarily converted from Aluminium oxide ($Al_2O_3$), which is also known as "Alumina". Aluminium oxide is largely produced or extracted from aluminium ores, primarily from the aluminium ore identified as Bauxite. Aluminum hydroxide production processes are used for extraction and production of the alumina, or aluminium oxide, from the Bauxite, which also typically contains of silica, various iron oxides, and titanium dioxide. After the aluminium oxide is purified, it is thereafter refined to produce aluminium metal. The aluminium hydroxide product process is the largest single cost in connection with aluminium production.

The principle industrial scale means of refining bauxite and producing aluminum hydroxide is by the well-established methods of the Bayer process. The Bayer process typically comprises a digestion stage, wherein alumina is extracted by digesting the bauxite ore in a solution of sodium hydroxide under high pressure and temperature, forming soluble sodium aluminate; followed by a clarification stage, wherein solid phase residue, known as "red mud", is removed from the sodium aluminate in solution; thereafter a precipitation stage, wherein aluminum hydroxide is precipitated from the sodium aluminate solution and grown in the form of aluminum hydroxide crystals, typically using seeding methods; followed by a classification stage, wherein crystal seeds are separated from the aluminum hydroxide product material; and thereafter a calcination stage, wherein the aluminium hydroxide decomposes to aluminium oxide, the alumina end product.

In order to increase the yield of aluminum hydroxide ($Al(OH)_3$) from the aluminate process liquors and achieve a given crystal size distribution, precipitation process operators carefully control operating parameters, such as precipitation temperature, cooling rate and seeding. Seeding, as described in European Patent Specification EP 0465055B1, is conducted in the precipitation stage and involves adding seed material to liquor pregnant with alumina. The seeds function as surface sites, aiding in the nucleation and growth of alumina bearing crystals of a particular distribution of specific sizes. In particular, some crystals are targeted as having a size optimized to facilitate easy and efficient separation from the liquor and further processing. Other crystals are targeted to having a size optimized for functioning as future seeds.

Even with such methods of controlling operating parameters, production is often limited because increasing yield solely by adjusting plant conditions can decrease particle size and in that parameters can vary from one plant to the next. Such parameters can include, but are not limited to, temperature profiles, seed charge, seed crystal surface area, purge of carbon dioxide or flue gases, liquor loading, liquor purity, and the like.

Extensive efforts have been invested into finding chemical additives and methods limiting the factors negatively affecting particle size in order to achieve the optimal economic recovery of aluminum hydroxide product. Such efforts include adding crystal growth modifiers (CGM) in the precipitation stage as an avenue to improve the yield of aluminum hydroxide product, while maintaining particle size. However, despite the continuous and ongoing development of methods suitable for obtaining aluminum hydroxide crystals with increased particle size, there is still a desire for improvements and enhancements for the aluminium hydroxide production process to address production quality and economic concerns.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

To satisfy continued industry needs, compositions and methods relating to the modification of the crystallization of aluminum hydroxide in an aluminum hydroxide production process, such as the Bayer process, have been developed. In at least one embodiment, the present invention relates to crystal growth modifier ("CGM") compositions and their addition to a precipitation liquor crystallization process for, at least in some embodiments, enhancing the production of crystal agglomerates from the precipitation liquor crystallization process.

In some embodiments, CGM compositions for enhancing the production of crystal agglomerates from a precipitation liquor crystallization process comprise a crude corn oil component, a biodiesel component or mixtures thereof. The crude corn oil component comprises crude corn oil extracted as a distinct phase byproduct from an ethanol production process, which comprise mono alkyl esters, including $C_{16}$ and $C_{18}$ ethyl esters, diglycerol esters and triglycerol esters of long chain fatty acids and can comprise free fatty acids. The biodiesel component comprises one or more biodiesels comprising methyl esters of long chain fatty acids, including $C_{16}$ and $C_{18}$ methyl esters, and can comprise free fatty acids. In some embodiments, the CGM compositions can be substantially free of further components.

CGM compositions in some embodiments comprise: 1-100 percent by weight of a crude corn oil component, a biodiesel component, or a mixture thereof; and 0-99 percent by weight of a carrier liquid, which can comprise a hydrocarbon liquid. The crude corn oil component comprises crude corn oil extracted as a distinct phase byproduct from an ethanol production process and the biodiesel component comprises a biodiesel substantially including methyl esters of long chain fatty acids.

The crude corn oil component can comprise 80% or more, and, in some embodiments, 85% or more, by weight mono alkyl esters, including $C_{16}$ and $C_{18}$ ethyl esters, diglycerol esters and triglycerol esters of long chain fatty acids and can comprise 0-15 percent by weight free fatty acids. In some embodiments, the crude corn oil component can include $C_{16}$ and $C_{18}$ ethyl esters from the crude corn oil in an amount of 1-10 percent by weight and diglycerol esters and triglycerol esters in an amount of 50-95 percent by weight. In some embodiments, the crude corn oil component comprises 1-10 wt % $C_{16}$-$C_{18}$ ethyl esters; 0.2-8 wt % diglycerol esters; and 70-90 wt % triglycerol esters. Free fatty acids can be present in various amounts from 0-15 percent by weight.

CGM compositions that include a crude corn oil component can comprise the crude corn oil component in amounts of 1-100 percent by weight. In further example embodiments, the crude corn oil component comprises 40-100 wt % and 98-100 wt %. In some embodiments, the CGM compositions can comprise 0.01-10% by weight $C_{16}$-$C_{18}$ ethyl esters and, in some embodiments, 0.5-95% by weight diglycerol and/or triglycerol esters.

The biodiesel component substantially comprises methyl esters of long chain fatty acids. In some embodiments, the biodiesel component comprises 90 percent by weight or more $C_{16}$, $C_{18}$ or $C_{22}$ methyl esters and 0-2 percent by weight free fatty acids. In further example embodiments, the biodiesel component comprises $C_{16}$, $C_{18}$ or $C_{22}$ methyl esters in amounts of 96 percent by weight or more and 98 percent by weight or more. In some embodiments, the biodiesel component comprises soybean based biodiesel and/or rapeseed based biodiesel.

CGM compositions that include a biodiesel component can comprise the biodiesel component in amounts of 1-100 percent by weight. In further example embodiments, the biodiesel component comprises 40-100 wt % and 98-100 wt %. In some embodiments, the CGM compositions can comprise 90% by weight $C_{16}$, $C_{18}$ or $C_{22}$ methyl esters from the biodiesel component, and, in some embodiments, 98% by weight $C_{16}$, $C_{18}$ or $C_{22}$ methyl esters from the biodiesel component.

In some embodiments, the CGM can comprise a mixture of the crude corn oil component and the biodiesel component. The mixture of the two components is compatible and stable. In some embodiments, the CGM composition can consist essentially of a crude corn oil component and a biodiesel component. In further embodiments, the CGM composition can comprise a crude corn oil component, a biodiesel component and a carrier liquid.

CGM components in some embodiments can further comprise an amount of the carrier liquid. The carrier liquid can comprise a hydrocarbon oil comprising aliphatic or aromatic oil compounds chosen from the group consisting of paraffinic oils, naphthenic oils, mixed paraffinic and aromatic oils, the residue of $C_{10}$ alcohol distillation, and mixtures thereof. In some embodiments, the CGM composition consists essentially of a crude corn oil component, a biodiesel component, or a mixture thereof and an amount of a carrier liquid.

CGM components in some embodiments can further comprise a fatty acid component. The fatty acid component can comprise a fatty acid having an alkyl chain length of $C_8$ to $C_{10}$ carbon atoms and being free of functional groups. In some embodiments, the CGM composition consists essentially of a crude corn oil component, a biodiesel component, or a mixture thereof, an amount of a carrier liquid and a fatty acid component.

In at least one embodiment of the invention, the CGM composition comprises, and in some embodiments consists essentially of, 1-100 wt % of a crude corn oil component and 0-99 wt % of a carrier liquid. The crude corn oil component comprises crude corn oil extracted as a distinct phase byproduct from an ethanol production process comprising 80 wt % or more of mono alkyl esters, including $C_{16}$ and $C_{18}$ ethyl esters, diglycerol esters and/or triglycerol esters of long chain fatty acids and 0-15 wt % free fatty acids. In some embodiments, the carrier liquid comprises a hydrocarbon liquid. In still further embodiments, the CGM composition comprises 0.01-10 wt % $C_{16}$ and $C_{18}$ ethyl esters from the crude corn oil component and 0.5-95 wt % diglycerol and triglycerol esters from the crude oil component. Examples of embodiments include CGM compositions, wherein the crude corn oil component comprises 40-100 wt % and 98-100 wt % of the CGM composition.

In at least one embodiment of the invention, the CGM composition comprises, and in some embodiments consists essentially of, 1-100 wt % of a biodiesel component and 0-99 wt % of a carrier liquid. The biodiesel component comprises 90 percent by weight or more $C_{16}$, $C_{18}$ or $C_{22}$ methyl esters and 0-2 percent by weight free fatty acids. In some embodiments, the carrier liquid comprises a hydrocarbon liquid. In still further embodiments, the CGM composition comprises $C_{16}$, $C_{18}$ or $C_{22}$ methyl esters in and amount of 96 percent by weight or more. In some embodiments, the CGM composition comprises 98 percent by weight or more. Examples of embodiments include CGM compositions, wherein the biodiesel component comprises 40-100 wt % and 98-100 wt % of the CGM composition.

In at least one embodiment of the invention, the CGM composition comprises, and in some embodiments consists essentially of, 1-100 wt % of a mixture of a crude corn oil component and a biodiesel component and 0-99 wt % of a carrier liquid. The crude corn oil component comprises crude corn oil extracted as a distinct phase byproduct from an ethanol production process comprising 80 wt % or more of mono alkyl esters, including $C_{16}$ and $C_{18}$ ethyl esters, diglycerol esters and/or triglycerol esters of long chain fatty acids and 0-15 wt % free fatty acids. The biodiesel component comprises 90 percent by weight or more $C_{16}$, $C_{18}$ or $C_{22}$ methyl esters and 0-2 percent by weight free fatty acids. In some embodiments, the carrier liquid comprises a hydrocarbon liquid. Examples of embodiments include CGM compositions, wherein the mixture of crude corn oil component and biodiesel component comprise 40-100 wt % and 98-100 wt % of the CGM composition.

In some embodiments, a process for recovering aluminum hydroxide crystals from an amount of pregnant Bayer process liquor by adding an amount of an embodiment of the CGM compositions to the liquor is disclosed.

In some embodiments of the invention, there are disclosed methods for enhancing the production and recovering of crystal agglomerates from a precipitation liquor crystallization process using an embodiment of the CGM compositions disclosed herein. In some embodiments, the method comprises the steps of (i) adding to precipitation liquor an amount effective to increase particle size of the crystal agglomerates of the CGM composition; (ii) distributing the CGM composition through the precipitation liquor; and (iii) precipitating crystal agglomerates from the precipitation liquor. The CGM composition effectuates an increase in particle size of the crystal agglomerates recovered compared to a precipitation liquor crystallization process absent a crystal growth modifier.

Embodiments further include a method for the production of aluminum hydroxide from a Bayer process liquor containing an aqueous phase of sodium aluminate. The liquor can be produced by separation of caustic-insoluble suspended solids. The method can include the steps of (i) adding to precipitation liquor of the Bayer process an amount of an embodiment of the CGM compositions as described herein; (ii) distributing the CGM composition through the precipitation liquor; and (iii) precipitating crystal agglomerates from the precipitation liquor. In the method, the CGM composition is added in an amount effective to shift in the particle size distribution of aluminum hydroxide crystals so that the resulting crystals have a reduced formation of product fines.

In some further embodiments, there is disclosed herein a method for producing alumina trihydrate crystals by crystallization of alumina trihydrate from a hot, caustic pregnant Bayer process liquor, to obtain a reduced percent of small size crystals of −325 mesh fraction thereby to increase the yield of crystals coarser than −325 mesh subsequently to be processed to yield aluminum. The method comprises the addition to the pregnant liquor, after red mud separation and immediately prior to crystallization of alumina trihydrate, of a CGM composition in accordance with the present invention in an amount effective to increase the yield of the coarser crystals. The CGM ester components can be dissolved in a hydrophobic liquid carrier having a boiling point above the temperature prevailing alumina hydrate crystallization.

In some embodiments, the components of the CGM composition are blended and introduced into the process in an amount effective to obtain the changes desired. In some embodiments, the compositions can be introduced in their primary, neat form without any further preparation.

In embodiments of the methods, the CGM composition can be added to the precipitation liquor in one or more of the following phases of the Bayer process: (i) to a precipitation feed liquor; (ii) to a seed slurry; (iii) into a precipitation tank; and (iv) into an existing input stream of a precipitation tank. In some embodiments, the CGM composition is distributed within the precipitation liquor by the means of conventional, high shear, or ultrasonic mixing.

In some embodiments, a CGM composition in accordance with the present disclosure, when added to a Bayer process for producing aluminum hydroxide crystals, effectuates a reduced formation of product fines concurrent with an upward shift in the particle size distribution of aluminum hydroxide, without substantial reduction in the overall product yield of aluminum hydroxide.

Advantages of the compositions and methods of the present invention include, but are not limited to, a reduction in the costs associated with the aluminium hydroxide product process, while enhancing the efficiency and effectiveness of the aluminum hydroxide production process. Advantages further include providing cost effective raw materials for CGM products and methods for formulating such CGM products. Advantages still further include providing CGM raw materials that can be used in production of high quality aluminium hydroxide which can be utilized for production of high quality aluminium, so as to minimize or reduce environmental impact. Further advantages include the utilization of byproduct material that otherwise is considered waste, so as to minimize or reduce environmental impact.

The above summary of various aspects of the disclosure is not intended to describe each illustrated aspect or every implementation of the disclosure. While multiple embodiments are disclosed, still other features, embodiments and advantages of the present invention will become apparent to those skilled in the art from the following detailed description, which shows and describes illustrative embodiments of the invention. Accordingly, the detailed description is to be regarded as illustrative in nature and not restrictive.

DETAILED DESCRIPTION OF THE INVENTION

The following are definitions that apply to the relevant terms as used throughout this specification. The organization of the definitions is for convenience only and is not intended to limit any of the definitions to any particular category.

"A/C" means the alumina to caustic ratio.

"CGM" means crystal growth modifier.

"Biodiesel" means the mono alkyl esters of long chain fatty acids derived from vegetable oils or animal fats.

"Hydrocarbon Carrier" means a hydrophobic liquid that can comprise or be comprised of aliphatic or aromatic compounds such as paraffinic oils, naphthenic oils, or fuel oils as well as bottoms or residual waste materials remaining from the production of aliphatic alcohols, the constituents of carriers can be used neat or as a mixture of any proportion but must have a boiling point safely above the temperature of the hot aluminate liquor undergoing precipitation (about 80° C.).

"Hydrocyclone" means a device to classify, separate or sort particles in a liquid suspension based on the ratio of their centripetal force to fluid resistance, in particular for dense and coarse particles, and low for light and fine particles, they often have a cylindrical section at the top where liquid is being fed tangentially and a conical base, and they often have two exits on the axis: the smaller on the bottom (for underflow) and a larger one at the top (for overflow), generally the underflow is the denser or coarser fraction, while the overflow is the lighter or finer fraction.

"Weight Percent Ratio" means the total weight fraction of one reagent within 100 grams of the composition or mixture.

"Product yield" means the amount of aluminum hydroxide solid content within the precipitating vessel at the end of a precipitation run. An increased product yield is generally indicated by a lower liquor aluminum hydroxide concentration for the corresponding vessel.

"Effective amount" means any dosage of any additive that affords an increase in the particle size distribution as measured by a change in the percent +45 µm fraction of the alumina trihydrate product. An effective amount also means a dosage of any additive that affords an increase in one of the three quantiles when compared to an undosed control sample.

"Liquor" or "Bayer Liquor" means a caustic, liquid medium that has run through at least a portion of a Bayer process in an industrial facility.

"Precipitation Liquor" means aluminate containing liquor in an aluminum hydroxide precipitation step of an alumina production process. The aluminate liquor may be referred to as various terms known to those of ordinary skill in the art, for example, pregnant liquor, green liquor, and aluminum hydroxide precipitation feed. The Bayer process is one example of an alumina production process. The term precipitation liquor may also include the aluminate solution directed to decomposition in a sintering-carbonation process or combined Bayer-sintering process as accomplished by the methods well known to those skilled in the art as described, for example, in U.S. Pat. Nos. 4,256,709, 3,642,437, 2,184,703, 2,257,347, and 2,181,695.

"Precipitation Feed Liquor" means the precipitation liquor that flows into a precipitator of an aluminum hydroxide precipitation process.

"Slurry" means a mixture comprising a liquid medium within which fines (which can be liquid and/or finely divided solids) are dispersed or suspended, when slurry is sparged, the tailings remain in the slurry and at least some of the concentrate adheres to the sparge bubbles and rises up out of the slurry into a froth layer above the slurry, the liquid medium may be entirely water, partially water, or may not contain any water at all.

"Consisting Essentially of" means that the methods and compositions may include additional steps, components, ingredients or the like, but only if the additional steps, components and/or ingredients do not materially alter the basic and novel characteristics of the claimed methods and compositions.

"Surfactant" is a broad term which includes anionic, nonionic, cationic, and zwitterionic surfactants. Enabling descriptions of surfactants are stated in *Kirk-Othmer, Encyclopedia of Chemical Technology*, Third Edition, volume 8, pages 900-912, and in *McCutcheon's Emulsifiers and Detergents*, both of which are incorporated herein by reference.

"Thickener" or "Settler" means a vessel used to effect a solid-liquid separation of a slurry, often with the addition of flocculants, the vessel constructed and arranged to receive a slurry, retain the slurry for a period of time sufficient to allow solid portions of the slurry to settle downward (underflow) away from a more liquid portion of the slurry (overflow), decant the overflow, and remove the underflow. Thickener underflow and thickener overflow are often passed on to filters to further separate solids from liquids.

"Spent Liquor" refers to liquor resulting from the removal of precipitated aluminum values after the final classification stage that returns back to digestion in the Bayer process.

"Paraffinic Oil" comprises a generally straight, saturated or unsaturated hydrocarbon chains. Some cyclic hydrocarbons are also contained in the Escaid 110 oil and are also classed as paraffinic.

"Free of functional group attachments" Means an alkyl chain of any length with hydrogen and carbon being the only atoms comprising that chain.

"Bioethanol Process" means a process for the production of ethanol or ethyl alcohol from starch or sugar-based feedstocks by either wet milling or dry milling.

"Wet Milling Process" means a process used in a Bioethanol Process for processing corn into ethanol. In a wet milling process, corn kernels or grains are steeped in warm water and dilute acid, which breaks down the proteins in the kernels and releases starch present in the corn, softening the kernel for the milling process. After steeping, the resulting corn slurry is processed (milled) through a series of grinders to separate the corn germ, fiber and starch products. Crude corn oil is extracted from the germ as a byproduct of the bioethanol process either on-site or sold to crushers who extract the corn oil. Ethanol production requires only the starch portion of a corn kernel, which is further processed in a distillation process. The remaining protein, fat, fiber and other nutrients can be returned to the global livestock and poultry feed markets or used for other known purposes.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.), this definition shall control how the term is to be defined in the claims.

While the invention is susceptible of embodiment in many different forms, this disclosure will describe in detail embodiments of the invention with the understanding that the present disclosure is to be considered as an exemplification of the principles of the invention and is not intended to limit the broad aspect of the invention to the embodiments illustrated.

The present invention is directed toward CGM compositions and the addition of the CGM compositions to precipitation liquor of a Bayer process system to effectuate an improvement in recovery of aluminum values from the aluminum hydroxide production process by increasing the particle size of the aluminum hydroxide product. In an embodiment, a CGM composition comprises a crude corn oil component, a biodiesel component or mixtures thereof. In some embodiments, the CGM composition can further comprise a carrier liquid. In further embodiments, the CGM composition can further comprise a fatty acid component comprising a fatty acid or a blend of fatty acids having an alkyl chain length of $C_8$-$C_{10}$ carbon atoms. Components of embodiments of the CGM compositions and methods of use are further described herein.

Crude Corn Oil Component

The crude corn oil component comprises, and in some embodiments consists essentially of, crude corn oil derived from or that is a byproduct of a corn based bioethanol process, wherein the crude corn oil is extracted as a distinct phase byproduct from an ethanol production process. In at least one embodiment, the bioethanol process utilizes wet milling in the bioethanol process in the processing of corn into ethanol.

The crude corn oil comprises mono alkyl esters, diglycerol esters and triglycerol esters of long chain fatty acids, free fatty acids and other components. The mono alkyl fatty acid esters comprise $C_{16}$-$C_{18}$ ethyl esters having the following formula:

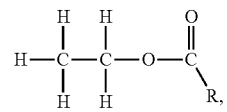

where R is C15-C17. In some embodiment, the fatty acid chains of the $C_{16}$-$C_{18}$ ethyl esters can include saturated fatty acid chains and can include unsaturated fatty acid chains. In some embodiments, the fatty acid chains of the $C_{16}$-$C_{18}$ ethyl esters are unbranched.

Examples of suitable crude corn oil components include crude corn oil byproduct having at least 1 wt % $C_{16}$-$C_{18}$ ethyl esters; 1.5-10 wt % $C_{16}$-$C_{18}$ ethyl esters; and 1.5-8 wt % $C_{16}$-$C_{18}$ ethyl esters. Examples of suitable crude corn oil derived from or that is a byproduct of a corn based bioethanol process can include the following components: major components, including C16:0 ethyl ester, C16:0 acid, C18:2 ethyl ester, C18:2 acid; C18:1 ethyl ester, C18:1 acid; C18:0 ethyl ester, C18:0 acid; fatty acid monoglycerol ester (MG); fatty acid diglycerol ester (DG); fatty acid triglycerol ester (TG); and some sterols, for example, stigmasterol, sitosterol, methyl cholesterol; minor components, including tocopherol, squalene, C16:1 ethyl ester, C16:1 acid, C14:0 ethyl ester, C14:0 acid; and further minor components can include C12:0 acid, C10:0 acid, myo-inositol, C4:0 acid, C5:0 acid, 1,3-butanediol, 1,3-propanediol, butanedioic acid, etc. (The foregoing component analysis was obtained by analyzing crude corn oil byproduct samples ("Samples") by Gas Chromatography—Mass Spectrometry (GC-MS) and the components were quantified by high temperature Gas Chromatography—Flame Ionization (GC-FID) with C21:0 acid as internal standard.)

The components of the above Samples were quantified by high temperature GC-FID with C21:0 acid as internal standard. The result is listed below in Table I:

TABLE I

Components

| Sample | Ethyl ester | Fatty acid | Fatty acid monoglycerol ester | Sterol | Fatty acid diglycerol ester | Fatty acid triglycerol ester | other | Sum |
|---|---|---|---|---|---|---|---|---|
| 1 | 2.63% | 12.43% | 0.84% | 1.08% | 5.62% | 77.06% | 0.36% | 100.00% |
| 2 | 2.13% | 12.81% | 0.53% | 0.64% | 6.08% | 77.80% | 0.00% | 100.00% |
| 3 | 1.92% | 10.59% | 0.77% | 0.29% | 0.31% | 86.12% | 0.00% | 100.00% |
| 4 | 7.66% | 4.03% | 0.71% | 0.40% | 3.43% | 83.77% | 0.00% | 100.00% |
| 5 | 1.91% | 10.65% | 0.70% | 0.20% | 2.11% | 84.42% | 0.00% | 100.00% |
| 6 | 3.17% | 10.10% | 0.69% | 0.40% | 3.37% | 82.28% | 0.00% | 100.00% |
| 7 | 5.59% | 8.92% | 0.90% | 0.81% | 4.41% | 79.37% | 0.00% | 100.00% |

Each Sample (1-7) is taken from distinct amounts of commercially available crude corn oil byproduct acquired from differing bioethanol suppliers in the United States of America.

In some embodiments, the crude corn oil component can comprise $C_{16}$-$C_{18}$ ethyl esters and diglycerol and triglycerol esters in amounts including 80 wt % or more and 85 wt % or more. In some embodiments, the $C_{16}$-$C_{18}$ ethyl esters are 1-10 wt % of the crude corn oil component. The diglycerol and triglycerol esters can be 50-95 wt % of the crude corn oil component. Further, in some embodiments, the crude corn oil component comprises 1-10 wt % $C_{16}$-$C_{18}$ ethyl esters; 0.2-8 wt % diglycerol esters; and 70-90 wt % triglycerol esters.

In some embodiments, the crude corn oil component can comprise free fatty acids in an amount of 0-15 wt %. Embodiments can include varied amounts of free fatty acids, including, but not limited to, 0-10 wt %, 1-14 wt %, 3-14 wt %, 4-15 wt % and 10-15 wt %

Embodiments of the invention can include CGM compositions having variations of the above amounts of the crude corn oil component having variations of the above crude corn oil compositions.

Biodiesel Component

The biodiesel component comprises, and in some embodiments consists essentially of, biodiesel or mixtures of biodiesels. The biodiesel(s) comprises mono alkyl esters of long chain fatty acids and can comprise free fatty acids. Examples of suitable biodiesels and their compositional components include the following Table II:

TABLE II

Biodiesel Composition Examples
Components (wt %) (all methyl esters)

| Oil or fat type | C8:0 | C10:0 | C12:0 | C14:0 | C16:0 | C18:0 | C20:0 | C22:0 | C24:0 | C18:1 | C22:1 | C18:2 | C18:3 | SUM |
|---|---|---|---|---|---|---|---|---|---|---|---|---|---|---|
| Soybean | 0 | 0 | 0 | 0.1 | 10.3 | 4.7 | 0 | 0 | 0 | 22.5 | 0 | 54.1 | 8.3 | 100 |
| Rapeseed | 0 | 0 | 0 | 0 | 2.7 | 2.8 | 0 | 0 | 0 | 21.9 | 50.9 | 13.1 | 8.6 | 100 |
| Beef-tallow | 0 | 0.1 | 0.1 | 3.3 | 25.2 | 19.2 | 0 | 0 | 0 | 48.9 | 0 | 2.7 | 0.5 | 100 |
| Peanut | 0 | 0 | 0 | 0 | 10.4 | 8.9 | 0 | 0 | 0 | 47.1 | 0.2 | 32.9 | 0.5 | 100 |
| Canola | 0 | 0 | 0 | 0.1 | 3.9 | 3.1 | 0 | 0 | 0 | 60.2 | 0.5 | 21.1 | 11.1 | 100 |
| Olive | 0 | 0 | 0 | 0 | 11 | 3.6 | 0 | 0 | 0 | 75.3 | 0 | 9.5 | 0.6 | 100 |
| Coconut | 8.3 | 6 | 46.7 | 18.3 | 9.2 | 2.9 | 0 | 0 | 0 | 6.9 | 0 | 1.7 | 0 | 100 |
| Corn | 0 | 0 | 0 | 0 | 9.9 | 3.1 | 0 | 0 | 0 | 29.1 | 0 | 56.8 | 1.1 | 100 |
| Palm | 0.1 | 0.1 | 0.9 | 1.3 | 43.9 | 4.9 | 0 | 0 | 0 | 39 | 0 | 9.5 | 0.3 | 100 |
| Safflower | 0 | 0 | 0 | 0.1 | 6.6 | 3.3 | 0 | 0 | 0 | 14.4 | 0 | 75.5 | 0.1 | 100 |
| Sunflower | 0 | 0 | 0 | 0.1 | 6 | 5.9 | 0 | 0 | 0 | 16 | 0 | 71.4 | 0.6 | 100 |
| Sunola | 0 | 0 | 0 | 0 | 3 | 4.4 | 0 | 0 | 0 | 88.2 | 0 | 4.3 | 0.1 | 100 |
| Butterfat | 5.5 | 3 | 3.6 | 11.6 | 33.4 | 11.4 | 0 | 0 | 0 | 27.8 | 0 | 3.1 | 0.6 | 100 |
| Lard | 0 | 0.1 | 0.1 | 1.4 | 25.5 | 15.8 | 0 | 0 | 0 | 47.1 | 0 | 8.9 | 1.1 | 100 |
| Cottonseed | 0 | 0 | 0 | 0.8 | 22.9 | 3.1 | 0 | 0 | 0 | 18.5 | 0 | 54.2 | 0.5 | 100 |
| Crambe | 0 | 0 | 0 | 0 | 2.07 | 0.7 | 2.09 | 0.8 | 1.12 | 18.86 | 58.51 | 9 | 6.85 | 100 |
| Linseed | 0 | 0 | 0 | 0 | 4.92 | 2.41 | 0 | 0 | 0 | 19.7 | 0 | 18.03 | 54.94 | 100 |

TABLE II-continued

Biodiesel Composition Examples
Components (wt %) (all methyl esters)

| Oil or fat type | C8:0 | C10:0 | C12:0 | C14:0 | C16:0 | C18:0 | C20:0 | C22:0 | C24:0 | C18:1 | C22:1 | C18:2 | C18:3 | SUM |
|---|---|---|---|---|---|---|---|---|---|---|---|---|---|---|
| H.O. safflower | 0 | 0 | 0 | 0.34 | 5.46 | 1.75 | 0.23 | 0 | 0 | 79.36 | 0 | 12.86 | 0 | 100 |
| Sesame | 0 | 0 | 0 | 0 | 13.1 | 3.92 | 0 | 0 | 0 | 52.84 | 0 | 30.14 | 0 | 100 |

Further details of the biodiesels, biodiesel components and methyl esters from biodiesel is found in Sanford, S.D., et al., "Feedstock and Biodiesel Characteristics Report," Renewable Energy.

The mono alkyl esters of long chain fatty acids of the biodiesel(s) comprise methyl esters. The methyl esters can have the following formula:

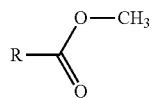

In some embodiments, R is $C_7$-$C_{21}$ ($C_8$-$C_{22}$ methyl esters) for 98 wt % or more of the methyl esters. In some embodiments, R is $C_{15}$, $C_{17}$ or $C_{21}$ ($C_{16}$, $C_{18}$ or $C_{22}$ methyl esters) for amounts of the methyl esters in the biodiesel(s) including, but not limited to, 90 wt % or more of the methyl esters, 96 wt % or more of the methyl esters and 98 wt % or more of the methyl esters. In some embodiments, the fatty acid chains of methyl esters can include saturated fatty acid chains and can include unsaturated fatty acid chains. In some embodiments, the fatty acid chains of the methyl esters are unbranched.

In some embodiments, the mono alkyl esters of long chain fatty acids are methyl esters and comprise 98 wt % or more of the biodiesel and the free fatty acids are 0-2 wt % of the biodiesel component.

In some embodiments, the biodiesel component comprises, and can consist essentially of, a soybean based biodiesel, a rapeseed based biodiesel, or mixtures thereof.

Embodiments of the invention can include variations of the above biodiesel compositions.

Carrier Liquid

In some embodiments, the CGM comprises a carrier liquid that performs as a vehicle for the crude corn oil or biodiesel component. The carrier liquid can be of a composition which allows the fatty acid ethyl esters and diglycerol and triglycerol esters in the crude corn oil component and/or the fatty acid methyl esters in the biodiesel component to be hydrolyzed to create fatty acids after being added to the Bayer process. The carrier liquid can be used neat or in a mixture of any proportion. The carrier liquid need only be a solvent and have a boiling point safely above the temperature of the hot aluminate liquor undergoing precipitation (about 80° C., 176° F.) in the Bayer process.

In some embodiments, the carrier liquid can be a hydrocarbon carrier, such as a hydrophobic liquid or blends of hydrophobic liquid, which can comprise aliphatic or aromatic oil compounds. Suitable examples include hydrocarbon oils, including, for example, paraffinic oils, naphthenic oils, or fuel oils, or any mixtures thereof. Examples of suitable hydrocarbon carriers include the oil carriers disclosed and described in U.S. Pat. No. 4,737,352, which is herein incorporated by reference in its entirety.

In some embodiments, the hydrophobic liquid can be a fatty alcohol-ether-ester complex derived from $C_{10}$ alcohol distillation. Examples of suitable hydrophobic liquid include bottoms or residual waste materials remaining from the production of aliphatic or alkyl alcohols, for example a $C_{10}$ alcohol. An example of suitable waste material is the $C_{10}$ alcohol distillation residue having a boiling point of about 250° C. (482° F.). It is light yellow to yellowish brown in color and has a specific gravity of about 0.862, OH—number about 90, SAP No about 50, weight percent acetic about 0.07 and carbonyl about 0.5. Chemically, it is 57-73 weight percent of primary branched chain $C_{10}$-$C_{22}$ alcohols (classed as fatty alcohols) and 29-41 weight percent of mixed long chain esters and ethers ($C_{18}$-$C_{33}$ ester; $C_{18}$-$C_{22}$ ether).

In some embodiments, the oil carrier can be a solution of tall oil fatty acid in a $C_{10}$ alcohol distillation residue, in the weight proportion of about 15:85, the dosage being about 20 mg/l. In further embodiments, it can be tall oil fatty acid in naphthenic oil, in the weight proportion of 15:85 and the dosage being about 20 mg/l.

Fatty Acid Component

The fatty acid component comprises, and in some embodiments consists essentially of, a fatty acid or a blend of fatty acids having an alkyl chain length of $C_8$-$C_{10}$ carbon atoms. In some embodiments, the $C_8$-$C_{10}$ fatty acid includes a carbon backbone which is free of functional groups, is saturated and unbranched.

Examples of suitable fatty acids and blends are described in U.S. Pat. No. 7,955,589, which is herein incorporated by reference in its entirety. An example of a suitable $C_8$-$C_{10}$ fatty acid is the product C-810 available from Proctor and Gamble. It is a yellow liquid with average molecular weight of 154 g/mol and approximate composition of the following fatty acid chain lengths: $C_6$<6%, $C_8$ 53-60%, $C_{10}$ 34-42% and $C_{12}$<2%. The carbon chain may be saturated or unsaturated, branched or unbranched and is free of functional groups. It is available from Proctor and Gamble at a concentration of 150 g/L dispersed in commercially available paraffinic hydrocarbon oil ESCAID 110.

The $C_8$-$C_{10}$ fatty acid can be dissolved in the carrier liquid (described below). An example includes a hydrocarbon oil that has a boiling point above about 200° F. In some embodiments, the ratio of the $C_8$-$C_{10}$ fatty acid and the hydrocarbon oil can have a weight proportion of about 15:85.

CGM Formulation

The CGM compositions comprise, and in some embodiments essentially consist of, the crude corn oil component, the biodiesel component or mixtures thereof. In some embodiments, the compositions can further include the carrier liquid. In some embodiments, the CGM compositions comprise, and in some embodiments essentially consist of, 1) the crude corn oil component, the biodiesel component or mixtures thereof; 2) the carrier liquid; and 3) the fatty acid component. In variations of the embodiments herein, the CGM compositions can be free of added water.

When the CGM comprises the crude corn oil component, in some embodiments the crude corn oil component comprises 1-100 wt % of the CGM. In various embodiments, the CGM comprises the crude corn oil component in the following amounts: 10-100 wt %; 40-100 wt %; 70-100 wt % and 98-100 wt %. In some embodiments, when the CGM comprises the crude corn oil component, the $C_{16}$-$C_{18}$ ethyl esters can be 0.01-10 wt % of the CGM and the diglycerol and triglycerol esters can be 0.5-95 wt % of the CGM. In some embodiments, the $C_{16}$-$C_{18}$ ethyl esters and the diglycerol and triglycerol esters can be 25 wt % or more, 50 wt % or more, or 85 wt % or more of the CGM Embodiments of the invention can include CGM compositions having variations of the above amounts of the crude corn oil component having variations of the above crude corn oil compositions.

When the CGM comprises the biodiesel component, in some embodiments the biodiesel component comprises 1.0-100 wt % of the CGM. In various embodiments, the CGM comprises the biodiesel component in the following amounts: 10-100 wt %; 40-100 wt %; 70-100 wt % and 98-100 wt %. Embodiments of the invention can include CGM compositions having variations of the above amounts of the biodiesel component having variations of the above biodiesel compositions.

In some embodiments, the CGM can comprise a mixture of the crude corn oil component and the biodiesel component. The mixture of the two components is compatible and stable. The present disclosure includes any mixture of the two components in any ratio. Examples of CGM comprising the biodiesel component and the crude corn oil component include, but are not limited to, CGM having mixtures ratios of 1-99:1-99, 10-90:10-90, 50:50, 25:75, and 75:25.

In embodiments of the CGM consisting essentially of the crude corn oil component, the biodiesel component or mixtures thereof, the CGM can be used neat. In some embodiments, the CGM formulation comprises dissolving the crude corn oil component and/or the biodiesel component in the carrier liquid, for example hydrocarbon oil. In some embodiments, the CGM formulation comprises mixing 40% crude corn oil component and 60% carrier liquid, for example hydrocarbon oil. In some embodiments, the CGM formulation comprises mixing about 20% biodiesel and 80% carrier liquid, for example hydrocarbon oil. In such embodiments, an example of a suitable biodiesel is a soybean oil based methyl ester.

Application of CGM Compositions

In application, the mixed/blended CGM composition can be delivered into the green or pregnant liquor (charge) of the precipitation process of an on-going Bayer process. The blended CGM compositions can be introduced into the process in an amount effective to obtain the changes desired. In some embodiments, the compositions can be introduced in their primary form without any further preparation.

The precipitation process in the Bayer process involves nucleation followed by (a) initial crystal growth and (b) agglomeration of those crystals into a coarse or sand-like alumina trihydrate particle which will later be dried, and often calcined to obtain $Al_2O_3$ as the commercial product of value.

The green or pregnant liquor (charge) present in the alumina trihydrate precipitation portion of the Bayer process is the hot caustic solution obtained after elimination of the red mud in the Bayer process. The green liquor, after red mud separation, is a hot, caustic filtrate, the commercial production green liquor containing the aluminum values as dissolved sodium aluminate. This liquor and recirculated fine particle alumina trihydrate seeds are charged into a suitable precipitating tank or a series of connecting tanks. Here, the charge is cooled under agitation to stress the contents, causing precipitation of alumina hydrate crystals on the seeds which constitute growth sites. Complete elimination of the fine particle material (e.g. −325 mesh or smaller) is not wanted. There needs to be a remnant source of seeds, following precipitation, for recirculation to serve the next generation of repeated growth in a continuous process.

In various embodiments of the invention, the CGM composition can be introduced into the precipitation liquor via various routes. As examples, the emulsified crystal growth modifier can be added, via in-line injection, to the precipitation liquor at the following steps of a Bayer process: a) to a precipitation feed liquor, b) to a seed slurry or other input stream to a precipitation tank, c) directly into a precipitation tank, and d) a combination thereof. In some embodiments, the CGM composition is added in such a manner as to be homogeneously distributed in the Bayer precipitation environment for unimpeded contact with the fine particulate.

The amount of CGM required to produce desirable effect depends upon the precipitation process parameters. Most often, this amount is determined by the surface area of available hydrated alumina solids in the precipitation liquor. The solids comprise the aluminum hydroxide introduced as seed or originated as new crystals or agglomerates during the decomposition of precipitation liquor.

In some embodiments, the amount of the CGM can range from about 0.01 to about 30 mg/m² of the available aluminum hydroxide seed area. In some embodiments, the amount can range from about 0.1 to about 15 mg/m². In some further embodiments, the amount can be less than about 8 mg/m² of CGM can be used. In some embodiments, the amount can be 1-3 mg/m².

In an instance wherein the available aluminum hydroxide area cannot be reliably determined, the precipitation operators can dose the CGM in relation to liquor flow by volume. In such a situation, in some embodiments, the CGM amount can range from about 0.01 to about 400 mg/liter of precipitation liquor. In some embodiments, the amount can range from about 0.05 to about 200 mg/liter of precipitation liquor. In some further embodiments, the amount can be less than about 100 mg/liter of CGM can be used. In some embodiments, the amount can range from about 10 to about 40 mg/liter of precipitation liquor.

Without being limited by a particular theory or design of the invention or of the scope afforded in construing the claims, it is believed that the fatty acid ethyl, diglycerol and triglycerol esters in the crude corn oil component and/or the fatty acid methyl esters in the biodiesel component to be hydrolyzed to create fatty acids after being added to the Bayer process. It is further believed that addition of some embodiments of the CGM compositions of the present application to the precipitation liquor and the hydrolyzing of the ethyl and/or methyl esters effectuates a reduction in the percent of alumina trihydrate crystal fines formed in the Bayer process substantially and thereby increasing the yield of alumina trihydrate crystals of optimal particle size. The addition of the CGM compositions thereby effectuates an increase in size of precipitated alumina trihydrate and an improvement in recovery of aluminum values.

In some embodiments of the invention, treatment use of the CGM compositions of the invention in practice is unaffected by different proprietary precipitation techniques involving proprietary process parameters. As described in U.S. Pat. No. 4,737,352 to Nalco, wherein generic tall oil fatty acid/oil formulations were first disclosed, this can be of great significance. Regardless of the proprietary processing parameters maintained inside the precipitating tank, the actual practice of treatment using the CGM compositions can simply involve mixing/blending the components and in-line injection of the CGM composition.

Examples of methods of introducing the CGM formulation include one or more of the methods described in U.S. Pat. Nos. 8,784,509, 7,771,681, 7,976,820, 7,976,821, 7,955,589, 4,737,352 and US Published Patent Applications 2007/0172405 and 2014/0271416. Examples of further efforts related to modification of crystallization of aluminum hydroxide in alumina production processes include the following: U.S. Pat. No. 5,106,599; EP0465055B1; U.S. Pat. Nos. 6,599,489; 5,312,603; and 6,168,767.

The above referenced patents and publication and any others that are otherwise referenced in this disclosure are herein incorporated by reference in their entireties. The methods, terms, tools, materials and teachings disclosed therein are herein incorporated only to the extent that they complement or expand the understanding and scope of the embodiments and claims of the presently disclosed invention and do not contradict or are inconsistent with such understanding and scope.

Applications and uses for the produced alumina include, but are not limited to, using in the alumina in the production of aluminium metal, abrasives, fillers in plastics and catalyst support for industrial catalysts.

Each of the components and methods disclosed herein can be used separately, or in conjunction with other components and methods, to provide improved compositions and methods for making and using the same. Therefore, combinations of components and methods disclosed herein may not be necessary to practice the disclosure in its broadest sense and are instead disclosed merely to particularly describe various embodiments.

Some examples of embodiments of the invention include but are not limited to:

1. A composition for enhancing the production of crystal agglomerates from a precipitation liquor crystallization process comprising:
    1-100 percent by weight of a crude corn oil component or a biodiesel component, wherein the crude corn oil component comprises crude corn oil extracted as a distinct phase byproduct from an ethanol production process and wherein the biodiesel component comprises a biodiesel comprising methyl esters of long chain fatty acids; and
    0-99 percent by weight of a carrier liquid, the carrier liquid comprising a hydrocarbon liquid.
2. The composition of embodiment 1, wherein the composition comprises the crude corn oil component, the crude corn oil component comprising
    80 percent or more by weight mono alkyl esters, including $C_{16}$ and $C_{18}$ ethyl esters, diglycerol esters and triglycerol esters of long chain fatty acids; and
    0-15 percent by weight free fatty acids.
3. The composition of embodiment 2, the composition comprising 40-100 percent by weight of the crude corn oil component.
4. The composition of embodiment 2, the composition comprising 98-100 percent by weight of the crude corn oil component.
5. The composition of embodiment 2 comprising an amount of the carrier liquid, wherein the hydrocarbon liquid is a hydrocarbon oil comprising aliphatic or aromatic oil compounds chosen from the group consisting of paraffinic oils, naphthenic oils, mixed paraffinic and aromatic oils, the residue of $C_{10}$ alcohol distillation, and mixtures thereof.
6. The composition of embodiment 5, wherein the composition consists essentially of the crude corn oil component and the carrier liquid.
7. The composition of embodiment 5, further comprising a fatty acid component, wherein 10 the fatty acid component comprises a fatty acid having an alkyl chain length of $C_8$ to $C_{10}$ carbon atoms and being free of functional groups.
8. The composition of embodiment 2, wherein the precipitation liquor crystallization process is a Bayer process.
9. The composition of embodiment 1, wherein the composition comprises the biodiesel component, the biodiesel comprising 90 percent by weight or more $C_{16}$, $C_{18}$ or $C_{22}$ methyl esters and 0-2 percent by weight free fatty acids.
10. The composition of embodiment 9, wherein the composition comprises 40-100 percent by weight of the biodiesel component.
11. The composition of embodiment 9, wherein the composition comprising 98-100 percent by weight of the biodiesel component.
12. The composition of embodiment 9 comprising an amount of the carrier liquid, wherein the hydrocarbon liquid is a hydrocarbon oil comprising aliphatic or aromatic oil compounds chosen from the group consisting of paraffinic oils, naphthenic oils, mixed paraffinic and aromatic oils, the residue of $C_{10}$ alcohol distillation, and mixtures thereof.
13. The composition of embodiment 12, wherein the composition consists essentially of the biodiesel component and the carrier liquid.
14. The composition of embodiment 12, further comprising a fatty acid component, wherein the fatty acid component comprises a fatty acid having an alkyl chain length of $C_8$ to $C_{10}$ carbon atoms and being free of functional groups.
15. The composition of embodiment 12, wherein the precipitation liquor crystallization process is a Bayer process.
16. The composition of embodiment 9, further comprising the crude corn oil component, the crude corn oil component comprising
    80 wt % or more weight mono alkyl esters, including $C_{16}$ and $C_{18}$ ethyl esters, diglycerol esters and triglycerol esters of long chain fatty acids; and
    0-15 percent by weight free fatty acids.
17. The composition of embodiment 16, wherein the composition consists essentially of the biodiesel component and the crude corn oil component.
18. A method for enhancing the production and recovering of crystal agglomerates from a precipitation liquor crystallization process, comprising the steps of:
    (i) adding to precipitation liquor an amount effective to increase particle size of the crystal agglomerates of a crystal growth modifying composition comprising:
        1-100 percent by weight of a crude corn oil component or a biodiesel component, wherein,
            the crude corn oil component comprises crude corn oil extracted as a distinct phase byproduct from an ethanol production process; and
            the biodiesel component comprises a biodiesel comprising methyl esters of long chain fatty acids; and
        0-99 percent by weight of a carrier liquid, the carrier liquid comprising a hydrocarbon liquid;
    (ii) distributing the crystal growth modifying composition through the precipitation liquor; and
    (iii) precipitating crystal agglomerates from the precipitation liquor,
wherein the crystal growth modifying composition effectuates an increase in particle size of the crystal agglomerates recovered compared to a precipitation liquor crystallization process absent a crystal growth modifier.

19. The method of embodiment 18, wherein the crystal growth modifying composition comprises the crude corn oil component, the crude corn oil component comprising 80 wt % or more weight mono alkyl esters, including $C_{16}$ and $C_{18}$ ethyl esters, diglycerol esters and triglycerol esters of long chain fatty acids; and
0-15 percent by weight free fatty acids.

20. The method of embodiment 19, wherein the crystal growth modifying composition comprises 98-100 percent by weight of the crude corn oil component.

21. The method of embodiment 19, wherein the crystal growth modifying composition comprises an amount of the carrier liquid, wherein the hydrocarbon liquid is a hydrocarbon oil comprising aliphatic or aromatic oil compounds chosen from the group consisting of paraffinic oils, naphthenic oils, mixed paraffinic and aromatic oils, the residue of $C_{10}$ alcohol distillation, and mixtures thereof.

22. The method of embodiment 21, wherein the crystal growth modifying composition consists essentially of the crude corn oil component and the carrier liquid.

23. The method of embodiment 18, wherein the crystal growth modifying composition comprises the biodiesel component, the biodiesel component comprising 90 percent by weight or more $C_{16}$, $C_{18}$ or $C_{22}$ methyl esters and 0-2 percent by weight free fatty acids.

24. The method of embodiment 23, the crystal growth modifying composition comprising 98-100 percent by weight of the biodiesel component.

25. The method of embodiment 23, wherein the crystal growth modifying composition comprises an amount of the carrier liquid, wherein the hydrocarbon liquid is a hydrocarbon oil comprising aliphatic or aromatic oil compounds chosen from the group consisting of paraffinic oils, naphthenic oils, mixed paraffinic and aromatic oils, the residue of $C_{10}$ alcohol distillation, and mixtures thereof.

26. The method of embodiment 25, wherein the crystal growth modifying composition consists essentially of the crude corn oil component and the carrier liquid.

27. The method of embodiment 23, further comprising the crude corn oil component, the crude corn oil component comprising
80 wt % or more weight mono alkyl esters, including $C_{16}$ and $C_{18}$ ethyl esters, diglycerol esters and triglycerol esters of long chain fatty acids; and
0-15 percent by weight free fatty acids.

28. The method of embodiment 27, wherein the crystal growth modifying composition consists essentially of the biodiesel component and the crude corn oil component.

29. The method of embodiment 18, wherein the crystal growth modifying composition is added to the precipitation liquor in one or more of the following phases of the Bayer process:
(i) to a precipitation feed liquor;
(ii) to a seed slurry;
(iii) into a precipitation tank; and
(iv) into an existing input stream of a precipitation tank.

30. A method for the production of aluminum hydroxide from a Bayer process liquor containing an aqueous phase of sodium aluminate, the liquor produced by separation of caustic-insoluble suspended solids, wherein the method comprises the steps of:
(i) adding to precipitation liquor of the Bayer process a crystal growth modifying composition;
(ii) distributing the crystal growth modifying composition through the precipitation liquor; and
(iii) precipitating crystal agglomerates from the precipitation liquor,
wherein the precipitation liquor has a top working temperature which is not exceeded in steps (i), (ii) and (iii) and the crystal growth modifying composition is selected from the group consisting of:
(a) a first composition comprising:
40-100 percent by weight of a crude corn oil component, the crude corn oil component comprising crude corn oil extracted as a distinct phase byproduct from an ethanol production process and comprising 80 percent or more by weight mono alkyl esters, including $C_{16}$ and $C_{18}$ ethyl esters, diglycerol esters and triglycerol esters of long chain fatty acids and 0-15 percent by weight free fatty acids; and
0-60 percent by weight of a carrier liquid, the carrier liquid being a hydrocarbon liquid having a boiling point above top working temperature,
(b) a second composition comprising:
40-100 percent by weight of a biodiesel component comprising a biodiesel having 90 percent by weight or more $C_{16}$, $C_{18}$ or $C_{22}$ methyl esters and 0-2 percent by weight free fatty acids; and
0-60 percent by weight of a carrier liquid, the carrier liquid being a hydrocarbon liquid having a boiling point above top working temperature, and
(c) a third composition comprising 10-90 percent by weight of the first composition and 10-90 percent by weight of the second composition,
wherein the crystal growth modifying composition is added in an amount effective to shift in the particle size distribution of aluminum hydroxide crystals so that the resulting crystals have a reduced formation of product fines and wherein the ethyl esters, diglycerol esters and triglycerol esters, when the first or third compositions are chosen, or the methyl esters, when the second or third compositions are chosen, are hydrolyzed in the precipitation liquor to form fatty acids.

31. The method according to embodiment 30, the crystal growth modifying composition comprising an amount of the carrier liquid, wherein the hydrocarbon liquid is a hydrocarbon oil comprising aliphatic or aromatic oil compounds chosen from the group consisting of paraffinic oils, naphthenic oils, mixed paraffinic and aromatic oils, the residue of $C_{10}$ alcohol distillation, and mixtures thereof.

EXAMPLES

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

For purposes of illustration and are not intended to limit the scope of the invention, a precipitation test was conducted on CGM compositions (Example 1 and Example 2) made in accordance with some embodiments of the invention and compared to various other crystal growth modifiers and controls. The tests were run using fresh pregnant liquor obtained from the reconstitution of plant spent liquor.

Precipitation Test Procedure:

Tests were run using either fresh pregnant liquor obtained from an alumina plant or using reconstituted pregnant liquor prepared by adding alumina trihydrate the plant spent liquor. The precipitation tests were performed in 250-mL Nalgene® bottles rotated end-over-end, at approximately 10-15 rpm, in an Intronics temperature-controlled water bath. Approximately 200 mL of liquor was accurately weighed into a series of bottles. The additive, where required, was dosed to the appropriate bottles and all the bottles were then placed in the rotating bath for equilibration at the given test temperature (about 145° F. to about 160° F.). After equilibration, the bottles were removed, quickly charged with the required quantity of seed and immediately returned to the water bath. The bottles were rotated for the given test duration. Four to six hours is typical.

On completion of the test, the bottles were removed from the bath and 10 mL of a sodium gluconate solution (400 g/L) was added to the remaining slurry and mixed well to prevent any further precipitation. The solids were collected by vacuum filtration and were thoroughly washed with hot deionized water and dried at 110° C.

The particle size distribution and specific surface area are determined on a Malvern Particle Sizer, which is well known in the art. Results are illustrated in Tables III and IV below. The particle size distribution is conveniently given by three quantiles, d(0.1), d(0.5) and d(0.9). These represent the diameters under which fall 10%, 50% and 90% of particles by volume, respectively. The percent increase over the control quantile particle size is the difference between the additive dosed and control for the respective quantile particle size divided by the control quantile particle size. The effect of CGM on the particle size distribution is inferred from the increase of the percent of particles sized greater than 45 µm (the size of alumina trihydrate product commonly monitored across the industry) in the precipitation product relatively to an undosed control sample. The greater the increase, the better the CGM performance in producing the large size crystals.

Testing Samples and Sample Tests

Two samples of Example 1 and two samples from Example 2 were separately compared against a two control samples (no crystal growth modifiers) and two samples of each of commercial products N7837 and N85651 using the precipitation test procedure as described above. The test results are described and shown in Tables III and IV below. The testing sample formulations were as follows:

The sample labeled "Example 1" was a biodiesel formula in accordance with an embodiment of the invention comprising 20% biodiesel and 80% hydrocarbon oil, wherein the biodiesel was soybean oil based methyl ester.

The sample labeled "Example 2" was a crude corn oil formula in accordance with an embodiment of the invention comprising 40% crude corn oil derived from a bioethanol process and 60% hydrocarbon oil.

The samples labeled N7837 and N85651 are commercial crystal growth modifier products available from Nalco Company, Naperville, Ill. as Nalco Product Nos. 7837 and 85651, respectively.

Tables III and IV show the effect of Examples 1 and 2 on particle size of Bayer aluminum trihydrate and compare the performance of Examples 1 and 2, respectively, to the control (no CGM) and the commercial products N7837 and N85651, as described above. The +45.7 µm % fraction data listed is the average of triplicate samples. The samples were tested using duplicate runs at the equal dosage of 3 mg/m² seed surface (60 ppm vs. green liquor); the sample bottles were charged with equal quantities of seed; and the bottles were rotated and had equal holding times (test durations).

Example 1

Test and Results

In the testing of Example 1, the liquor was fresh pregnant liquor with A/C=0.65; and the test temperature (precipitation temperature) during the holding time was 70° C. The comparison results are shown in Table III.

TABLE III

| SAMPLES | DOSAGE, ppm | QUANTILE PARTICLE SIZE | | | | % INCREASE IN MEAN OF CONTROL QUANTILE PARTICLE SIZE | | | |
|---|---|---|---|---|---|---|---|---|---|
| | | D(0.1), µm | D(0.5), µm | D(0.9), µm | +45.7 µm, % | D(0.1), µm | D(0.5), µm | D(0.9), µm | +45.7 µm, % |
| Control 1 | — | 28.54 | 50.25 | 85.89 | 59.71 | | | | |
| Control 2 | — | 28.86 | 50.26 | 85.02 | 59.90 | | | | |
| Average | | 28.70 | 50.26 | 85.46 | 59.80 | | | | |
| N7837 | 60 | 31.34 | 54.34 | 91.38 | 68.66 | | | | |
| N7837 | 60 | 30.93 | 53.66 | 90.11 | 69.08 | | | | |
| Average | | 31.13 | 54.00 | 90.75 | 68.87 | 08% | 07% | 06% | 15% |
| N85651 | 60 | 30.98 | 53.61 | 89.94 | 65.59 | | | | |
| N85651 | 60 | 29.92 | 52.20 | 88.42 | 63.13 | | | | |
| Average | | 30.45 | 52.91 | 89.18 | 64.36 | 06% | 05% | 04% | 08% |
| Example 1 | 60 | 31.20 | 54.34 | 91.71 | 66.55 | | | | |
| Example 1 | 60 | 30.44 | 52.94 | 88.97 | 66.44 | | | | |
| Average | | 30.82 | 53.64 | 90.34 | 65.49 | 07% | 07% | 06% | 11% |

The results in Table III indicate that Example 1, employing a biodiesel formula in accordance with the present invention, provides a %+45 µm fraction that is a substantive increase relative to the undosed control sample and as such substantially increases particle size of aluminum trihydrate in comparison with the controls. The table further shows that the biodiesel formula outperforms commercial crystal growth modifier product N85651. Surprisingly, the biodiesel formula, despite using biodiesel rather than traditional active components, results in increased CGM activity which is comparable to that of commercial CGMs.

Example 2

Test and Results

In the testing of Example 2, the liquor was fresh pregnant liquor with A/C=0.70; and the test temperature (precipitation temperature) during the holding time was 70° C. The comparison results are shown in Table IV.

TABLE IV

| SAMPLES | DOSAGE, ppm | QUANTILE PARTICLE SIZE | | | | % INCREASE IN MEAN OF CONTROL QUANTILE PARTICLE SIZE | | | |
|---|---|---|---|---|---|---|---|---|---|
| | | D(0.1), μm | D(0.5), μm | D(0.9), μm | +45.7 μm, % | D(0.1), μm | D(0.5), μm | D(0.9), μm | +45.7 μm, % |
| Control 1 | — | 31.74 | 60.35 | 103.11 | 71.42 | | | | |
| Control 2 | — | 31.52 | 57.00 | 100.51 | 69.17 | | | | |
| Average | | 31.63 | 58.67 | 101.81 | 70.30 | | | | |
| N7837 | 60 | 36.58 | 62.84 | 106.14 | 78.05 | | | | |
| N7837 | 60 | 38.40 | 63.09 | 101.84 | 80.51 | | | | |
| Average | | 37.49 | 62.96 | 103.99 | 79.28 | 19% | 07% | 02% | 13% |
| N85651 | 60 | 34.42 | 59.83 | 101.67 | 74.10 | | | | |
| N85651 | 60 | 35.09 | 60.81 | 103.09 | 75.41 | | | | |
| Average | | 34.75 | 60.32 | 102.38 | 74.75 | 10% | 03% | 01% | 06% |
| Example 2 | 60 | 37.35 | 64.70 | 109.37 | 79.75 | | | | |
| Example 2 | 60 | 38.36 | 65.70 | 109.68 | 81.26 | | | | |
| Average | | 37.85 | 65.20 | 109.53 | 80.51 | 20% | 11% | 08% | 15% |

The results in Table IV indicate that Example 2, employing a crude corn oil formula in accordance with the present invention, provides a %+45 μm fraction that is a substantive increase relative to the undosed control sample and as such substantially increases particle size of aluminum trihydrate in comparison with the controls. The table further shows that the crude corn oil formula outperforms both of the commercial crystal growth modifier products N7837 and N85651. Surprisingly, the crude corn oil formula, despite using crude corn oil derived from a bioethanol process rather than traditional active components, results in increased CGM activity which outperforms commercial CGMs.

While this invention may be embodied in many different forms, there are described in detail herein particular embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety for all purposes. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The invention is not restricted to the details of the foregoing embodiment (s). The invention extends to any novel one, or any novel combination, of the features disclosed in this specification (including any incorporated by reference references, any accompanying claims, and abstract), or to any novel one, or any novel combination, of the steps of any method or process so disclosed.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

References to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 USC §112(f) are not to be invoked unless the specific terms "means for" or "step for" are recited in the respective claim.

This completes the description of various embodiments of the invention. Those skilled in the art may recognize other equivalents to the specific embodiment described herein which equivalents are intended to be encompassed by the claims attached hereto.

The invention claimed is:

1. A method for enhancing the production and recovering of crystal agglomerates from a precipitation liquor crystallization process, comprising the steps of:
   adding to precipitation liquor an amount effective to increase particle size of the crystal agglomerates of a crystal growth modifying composition comprising:
      1-100 percent by weight of a crude corn oil component, a biodiesel component or a mixture of the crude corn oil component and the biodiesel component, wherein the crude corn oil component comprises crude corn oil extracted as a distinct phase byproduct from an ethanol production process and is 80 percent by weight or more weight mono alkyl esters, including $C_{16}$ and $C_{18}$ ethyl esters, diglycerol esters and triglycerol esters of long chain fatty acids, and 0-15 percent by weight free fatty acids; and the biodiesel component comprises a biodiesel or a mixture of biodiesels comprising methyl esters of long chain fatty acids and is 90 percent by weight or more $C_{16}$, $C_{18}$ or $C_{22}$ methyl esters and 0-2 percent by weight free fatty acids; and 0-99 percent by weight of a carrier liquid, the carrier liquid comprising a hydrocarbon liquid;

(ii) distributing the crystal growth modifying composition through the precipitation liquor; and (iii) precipitating crystal agglomerates from the precipitation liquor, wherein the crystal growth modifying composition effectuates an increase in particle size of the crystal agglomerates recovered compared to a precipitation liquor crystallization process absent a crystal growth modifier.

2. The method of claim 1, wherein the crystal growth modifying composition comprises 98-100 percent by weight of the crude corn oil component, the biodiesel component or the mixture of the crude corn oil component and the biodiesel component.

3. The method of claim 1, wherein the crystal growth modifying composition consists essentially of the crude corn oil component, the biodiesel component or the mixture of the crude corn oil component and the biodiesel component and the and the carrier liquid, wherein the hydrocarbon liquid is a hydrocarbon oil comprising aliphatic or aromatic oil compounds chosen from the group consisting of paraffinic oils, naphthenic oils, mixed paraffinic and aromatic oils, the residue of $C_{10}$ alcohol distillation, and mixtures thereof.

4. The method of claim 1, the crystal growth modifying composition comprising 40-100 percent by weight of the crude corn oil component, the biodiesel component or the mixture of the crude corn oil component and the biodiesel component and the carrier liquid, wherein the mixture of the crude corn oil component and the biodiesel component comprises 10-90 percent by weight of the crude corn oil component and 10-90 percent by weight of the biodiesel component; and 0-60 percent by weight of the carrier liquid, wherein the crystal growth modifying composition is added in an amount effective to shift in the particle size distribution of aluminum hydroxide crystals so that the resulting crystals have a reduced formation of product fines and wherein the ethyl esters, diglycerol esters, triglycerol esters and methyl esters are hydrolyzed in the precipitation liquor to form fatty acids.

* * * * *